July 1, 1969

W. J. G. COX 3,452,657

MULTIPLE PIN-HOLE CAMERA

Filed July 18, 1966

INVENTOR
William J. G. Cox
BY Weir, Marshall,
MacRae & Lamb
PATENT AGENT

3,452,657
MULTIPLE PIN-HOLE CAMERA
William J. G. Cox, 123 Arbeatha Ave.,
Ottawa 6, Ontario, Canada
Filed July 18, 1966, Ser. No. 565,919
Int. Cl. G03b 19/02
U.S. Cl. 95—11                                    1 Claim

ABSTRACT OF THE DISCLOSURE

A pin-hole camera having a varying density neutral filter adjacent to the image plane and a corrector plate between the object plane and the pin-hole array. The filter is used to compensate for undesired variations in image intensity. The corrector plate compensates for undesired lateral shifts in image points.

---

This invention relates to a multiple pin-hole camera and, in particular, to the use of a neutral density filter of varying transmittance to ensure contrast and dimensional uniformity among the multiple images produced by such a camera.

Multiple pin-hole cameras are cameras having a plane array of pin-holes, usually symmetrically arranged, which produce a corresponding array of similar images from a single object. These cameras find particular utility in the preparation of microphotographs containing an array of identical images such as are used in the manufacture of semiconductor devices and integrated circuits.

Three factors adversely affect the accuracy of the images formed by such multiple pin-hole cameras. These are (1) variations in intensity caused by variation in path length of the image forming rays and variation of illumination over the object plane; (2) variations in intensity caused by variation in pin-hole aperture size and (3) lateral shifts caused by refracting material in the camera.

The first two factors are of significance because the dimensions of an image formed on a photographic plate vary with the total exposure (product of light intensity and time). This results in the image dimensions varying with position in the array. The lateral shift caused by refracting material in the camera varies with the obliqueness of the image forming rays and thus will cause the dimensions to vary across each image and from image to image.

It is, therefore, an object of this invention to provide a novel arrangement in a multiple pin-hole camera of a varying density neutral filter to compensate for the undesired variation in image intensity described above.

It is a further object of this invention to provide a novel method for producing such a varying density neutral filter.

It is a still further object of this invention to provide a novel arrangement in a multiple pin-hole camera of a corrector plate to remove the undesired lateral shifts in image position described above.

Briefly, this invention includes the provision of a varying density neutral filter located adjacent to the image plane of a multiple pin-hole camera. The filter is termed "neutral" in that its transmittance at any point is uniform for all wavelengths. The filter has "varying density" in that the transmittance is chosen to be complementary to the undesired variation in image intensity so that there is uniform effective contrast over the image array. The preferred method for manufacturing such a varying density neutral filter is to expose a photographic plate at the image plane while illuminating the object plane with the light source intended for producing the final patterned images. The plate records the undesired variations in image intensity and, when developed, provides the required varying density neutral filter. This invention also includes the provision of a corrector plate to compensate for undesired lateral shifts in image points caused by other plates of refracting material in the camera. Such a corrector plate is located on the opposite side of the pin-hole plane from the refracting material providing the undesired lateral shift.

Further features of this invention will become apparent from the following description, taken in conjunction with the accompanying drawings in which.

Figure 1:
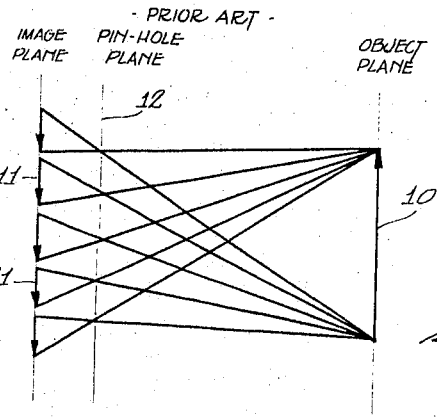
FIGURE 1 is a diagrammatic representation of a multiple pin-hole camera.

Referring now to FIGURE 1 there is shown, in diagrammatic form, a known multiple pin-hole camera suitable for producing an array of identical images from a single object. An array of pin-holes arranged in a plane 12 produces multiple images 11 of an object 10. Due to the variation in angle of the image forming rays and to any lack of illuminating source spatial uniformity the image intensity varies with image position and if a photographic plate is positioned in the image plane the thickness of any lines in an image will be dependent on the location of the image. It is important in the manufacture of semiconductor devices that the images in each microphotograph should be identical with each other and also in registration with other microphotographs pertaining to the same device.

Figure 2:
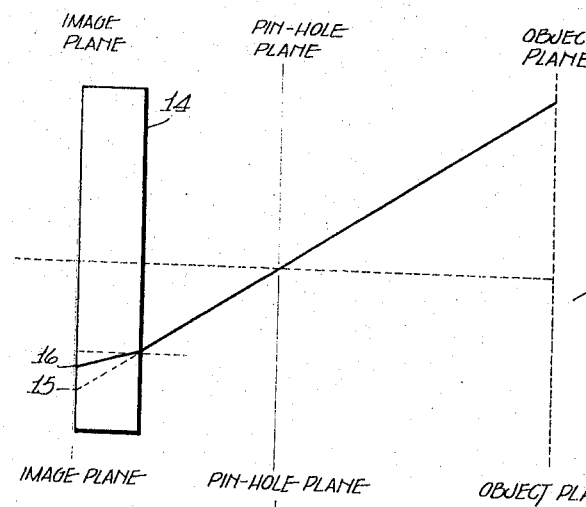
FIGURE 2 is a diagrammatic representation of a camera using the varying density neutral filter of this invention.

To compensate for the undesired variation in image intensity a varying density neutral filter is provided as shown at 14 in FIGURE 2. This filter has a varying transmittance sufficient to compensate for the undesired variations in image intensity. That is, where the local illumination in the image plane is higher than average the filter has less transmittance than for areas of lower illumination. Clearly, such a filter can be used to compensate for all factors leading to non-uniform image intensity including the obliqueness of the image forming rays non-uniform source and variation in pin-hole aperture dimensions; presupposing registration of items is maintained. The preferred form of filter 14 is a photographic plate, however, other forms of filter well known to those skilled in the art such as thin films, may be used.

The use of a photographic plate as filter 14 has the advantage that it permits the camera to be used to make its own filter. The preferred method for constructing the varying density filters is to expose a photographic plate at the image plane while illuminating the object plane with the source intended for final use. The photographic plate is then developed and becomes the varying density filter.

As can be seen in FIGURE 2 the introduction of the varying density filter 14 in the form of a photographic plate results in an undesired lateral shift of an image point 15 to a point 16. This lateral shift will occur for all image points not on the camera axis and is a function of the angle of the image forming ray. A similar lateral shift will be caused by any other plates of refracting material in the camera. For example, the pin-hole array may also be formed on a photographic plate and, thus, contribute to the lateral shift of image points.

Figure 3:
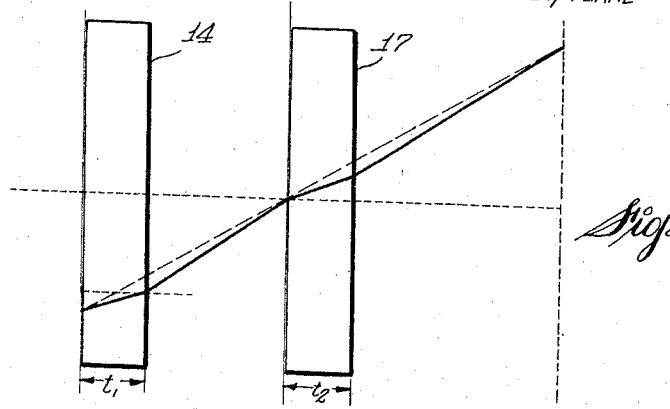
FIGURE 3 is a diagrammatic representation of a camera using the varying density neutral filter and the corrector plate of this invention.

To correct for such undesired lateral shifts a corrector plate may be used as shown at 17 in FIGURE 3. Corrector plate 17 is formed from material of uniform transmittance and is located between the pin-hole plane and the object plane to compensate for lateral shifts caused by refractive plates on the opposite side of the pin-hole plane. If it is assumed that all the refractive material in the camera has the same index of refraction, and if $t_1$ is the total thickness of refractive material at the image side of the pin-hole plane and $t_2$ is the total thickness of material at the object side of the image plane, then it can be shown that the condition for the absence of undesired lateral shifts is $$t_1/t_2 = v/u$$

where $u$ is the distance from the object plan to the pin-hole plane and $v$ is the distance from the image plane to the pin-hole plane. It will be realized that $v/u$ is the magnification factor of the camera.

According to this invention the corrector plate can be positioned either at the object or image side of the pin-hole plane depending on whether it is necessary to increase $t_2$ or $t_1$ respectively, to satisfy the above condition. When using the varying density filter the corrector plate will generally be placed at the opposite side, that is the object side, of the pin-hole plane.

Thus, there has been described a multiple pin-hole camera using a varying density neutral filter to obtain uniformity of contrast among the multiple images produced. There has also been described a corrector plate for use with such a camera and, in particular, for use with a varying density filter. It will be clear to those skilled in the art that the refractive index of the corrector plate need not be the same as that of the filter and the correct relationship of thicknesses to avoid lateral shift may also be calculated for such a case.

I claim:
1. In a multiple pin-hole camera having an object plane, an image plane, a pin-hole array and a source of illumination for said object plane producing a corresponding image array on the image plane, the improvement comprising, a varying density neutral filter located adjacent to said image plane between said image plane and said pin-hole array, and a corrector plate of uniform transmittance located between said pin-hole array and said object plane to compensate for undesired lateral shifts in said image array caused by refractive material between said pin-hole array and said image plane, the transmittance of said filter producing uniform illumination of said image array when said object plane is illuminated by said source, said corrector plate having an index of refraction the same as that of said refractive material and having a thickness $t_2$ satisfying the relationship $$t_1/t_2 = v/u$$

where $t_1$ is the thickness of the refractive material, $u$ is the distance between the object plane and the pin-hole array and $v$ is the distance between the image plane and the pin-hole array.

References Cited

UNITED STATES PATENTS

| | | | |
|---|---|---|---|
| 3,109,117 | 10/1963 | Kaplan | 95—1 X |
| 3,279,340 | 10/1966 | Ramberg et al. | 95—1 |
| 3,320,852 | 5/1967 | Parrent et al. | 88—24 |
| 3,380,354 | 4/1968 | Thornton | 95—1 |
| 2,817,276 | 12/1957 | Epstein et al. | 95—1 |
| 2,982,175 | 5/1961 | Eisler | 95—11 X |
| 3,259,038 | 7/1966 | Burdick et al. | 95—1 |

NORTON ANSHER, *Primary Examiner.*

CHARLES E. SMITH, *Assistant Examiner.*

U.S. Cl. X.R.

95—1